(12) United States Patent
Popescu et al.

(10) Patent No.: US 12,060,148 B2
(45) Date of Patent: Aug. 13, 2024

(54) GROUND RESONANCE DETECTION AND WARNING SYSTEM AND METHOD

(71) Applicant: HONEYWELL INTERNATIONAL INC., Charlotte, NC (US)

(72) Inventors: Michael Popescu, Phoenix, AZ (US); Murali Mohan Talapureddi, Hyderabad (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 127 days.

(21) Appl. No.: 17/937,608

(22) Filed: Oct. 3, 2022

(65) Prior Publication Data

US 2024/0059406 A1    Feb. 22, 2024

(30) Foreign Application Priority Data

Aug. 16, 2022    (IN) .............................. 202211046471

(51) Int. Cl.
*B64C 27/00*    (2006.01)
*B64D 45/08*    (2006.01)

(52) U.S. Cl.
CPC .......... *B64C 27/006* (2013.01); *B64C 27/001* (2013.01); *B64D 45/08* (2013.01)

(58) Field of Classification Search
CPC ..... B64C 27/006; B64C 27/001; B64D 45/08; B64D 45/00; B64D 45/04
See application file for complete search history.

(56) References Cited

U.S. PATENT DOCUMENTS

| | | | |
|---|---|---|---|
| 2,024,271 | A | 12/1935 | Blumlein et al. |
| 2,086,883 | A | 7/1937 | Shanley |
| 2,394,472 | A | 2/1946 | Pecker |

(Continued)

FOREIGN PATENT DOCUMENTS

| | | | |
|---|---|---|---|
| CA | 792429 A | 8/1968 |
| CA | 2805454 A1 | 9/2013 |

(Continued)

OTHER PUBLICATIONS

Roesch, P. et al., "Towards Generalized Active Control of Helicopters," Proceedings of the European Rotorcraft Forum. Cernobbio, Sep. 14-16, 1993, vol. 1, Sep. 14, 1993.

(Continued)

*Primary Examiner* — Alentina Xavier
(74) *Attorney, Agent, or Firm* — Lorenz & Kopf LLP (57) ABSTRACT

A system and method for detecting ground resonance and providing a warning regarding the same includes supplying, from an inertial navigation system (INS), inertial data indicative of an inertial profile of a rotorcraft, and supplying, from a sensor system, sensor data that indicates when the rotorcraft is at least partially on a landing surface. The sensor data is processed, in a processing system, to determine when the rotorcraft is at least partially on the landing surface, and when the rotorcraft is determined to be at least partially on the landing surface, the inertial data is processed, in the processing system to determine when the inertial profile of the rotorcraft indicates ground resonance may occur. Upon determining that ground resonance may occur, one or more alert signals are generated in the processing system.

20 Claims, 3 Drawing Sheets

(56) References Cited

U.S. PATENT DOCUMENTS

| | | |
|---|---|---|
| 2,437,789 A | 3/1948 | Robbins |
| 2,456,485 A | 12/1948 | Bendix |
| 2,465,193 A | 3/1949 | Boyle |
| 2,494,445 A | 1/1950 | Moeller |
| 2,509,314 A | 5/1950 | Pullin |
| 2,529,635 A | 11/1950 | Sikorsky et al. |
| 2,531,598 A | 11/1950 | Avery |
| 2,539,562 A | 1/1951 | Avery |
| 2,554,774 A | 5/1951 | Buivid |
| 2,581,412 A | 1/1952 | Herzog |
| 2,604,174 A | 7/1952 | Worrel |
| 2,665,859 A | 1/1954 | Papadakos |
| 2,730,311 A | 1/1956 | Doak |
| 2,755,871 A | 7/1956 | Gerstenberger |
| 2,755,872 A | 7/1956 | Gerstenberger |
| 2,774,553 A | 12/1956 | Jensen |
| 2,856,179 A | 10/1958 | Hogan |
| 2,887,650 A | 5/1959 | Ruddock et al. |
| 2,919,127 A | 12/1959 | Prescott |
| 2,933,270 A | 4/1960 | Maltby |
| 2,943,826 A | 7/1960 | Nye et al. |
| 2,949,965 A | 8/1960 | De Tore et al. |
| 2,955,785 A | 10/1960 | Smith |
| 2,971,586 A | 2/1961 | Schon |
| 3,002,711 A | 10/1961 | Stefano |
| 3,007,654 A | 11/1961 | Doman |
| 3,011,778 A | 12/1961 | Yntema |
| 3,078,061 A | 2/1963 | Marie |
| 3,078,967 A | 2/1963 | Brown et al. |
| 3,101,920 A | 8/1963 | Fradenburgh |
| 3,107,733 A | 10/1963 | Derschmidt |
| 3,108,220 A | 10/1963 | Ruddock |
| 3,134,444 A | 5/1964 | Egerton et al. |
| 3,168,694 A | 2/1965 | Slattery |
| 3,173,632 A | 3/1965 | Woods |
| 3,202,076 A | 8/1965 | Fieni |
| 3,288,402 A | 11/1966 | Icenbice, Jr. et al. |
| 3,314,628 A | 4/1967 | Myers |
| 3,346,969 A | 10/1967 | Marvin |
| 3,386,031 A | 5/1968 | Able et al. |
| 3,386,689 A | 6/1968 | Parker et al. |
| 3,484,173 A | 12/1969 | Rybicki |
| 3,496,525 A | 2/1970 | Francis |
| 3,500,395 A | 3/1970 | Foster et al. |
| 3,503,575 A | 3/1970 | Mil et al. |
| 3,538,428 A | 11/1970 | Barringer |
| 3,547,555 A | 12/1970 | Jensen |
| 3,550,130 A | 12/1970 | Shaw |
| 3,589,835 A | 6/1971 | Linden |
| 3,669,566 A | 6/1972 | Bourquardez et al. |
| 3,695,780 A | 10/1972 | Velkoff |
| 3,701,499 A | 10/1972 | Schubert et al. |
| 3,702,479 A | 11/1972 | Uhrig |
| 3,738,804 A | 6/1973 | Ortheil et al. |
| 3,757,286 A | 9/1973 | Richard |
| 3,765,267 A | 10/1973 | Bourquardez et al. |
| 3,790,278 A | 2/1974 | Buczek et al. |
| 3,797,964 A | 3/1974 | Hanson |
| 3,803,614 A | 4/1974 | Reid |
| 3,823,399 A | 7/1974 | Yamanaka |
| 3,823,402 A | 7/1974 | Tharp |
| 3,836,098 A | 9/1974 | Miyashita |
| 3,836,841 A | 9/1974 | Morrison |
| 3,858,518 A | 1/1975 | Nyman |
| 3,911,436 A | 10/1975 | Schanzer et al. |
| 3,916,760 A | 11/1975 | Sewell et al. |
| 3,923,419 A | 12/1975 | Mouille |
| 3,967,862 A | 7/1976 | Hunter et al. |
| 3,967,918 A | 7/1976 | Mouille et al. |
| 3,999,886 A | 12/1976 | Ormiston et al. |
| 4,017,767 A | 4/1977 | Ball |
| 4,073,600 A | 2/1978 | Doman |
| 4,088,042 A | 5/1978 | Desjardins et al. |
| 4,088,286 A | 5/1978 | Masclet et al. |
| 4,135,856 A | 1/1979 | Mcguire |
| 4,140,028 A | 2/1979 | Desjardins |
| 4,142,698 A | 3/1979 | Niebanck et al. |
| 4,168,819 A | 9/1979 | Ducrocq |
| 4,178,130 A | 12/1979 | Ferris et al. |
| 4,196,878 A | 4/1980 | Michel |
| 4,197,547 A | 4/1980 | Czerwinski |
| 4,213,518 A | 7/1980 | Lavoie et al. |
| 4,222,709 A | 9/1980 | Mouille |
| 4,249,862 A | 2/1981 | Waddington et al. |
| 4,255,084 A | 3/1981 | Mouille et al. |
| 4,270,711 A | 6/1981 | Cresap et al. |
| 4,273,511 A | 6/1981 | Mouille et al. |
| 4,284,255 A | 8/1981 | Masclet et al. |
| 4,297,078 A | 10/1981 | Martin |
| 4,304,525 A | 12/1981 | Mouille |
| 4,323,332 A | 4/1982 | Fradenburgh |
| 4,332,525 A | 6/1982 | Cheney, Jr. |
| 4,341,499 A | 7/1982 | Peterson |
| 4,345,237 A | 8/1982 | Lerche et al. |
| 4,360,337 A | 11/1982 | Frommlet et al. |
| 4,362,281 A | 12/1982 | Cresap et al. |
| 4,365,770 A | 12/1982 | Mard et al. |
| 4,381,902 A | 5/1983 | Head et al. |
| 4,385,279 A | 5/1983 | Meador |
| 4,405,119 A | 9/1983 | Masclet et al. |
| 4,407,633 A | 10/1983 | Mouille |
| 4,420,400 A | 12/1983 | Weitzen |
| 4,421,061 A | 12/1983 | Shomer |
| 4,427,340 A | 1/1984 | Metzger et al. |
| 4,427,905 A | 1/1984 | Sutton |
| 4,445,672 A | 5/1984 | Turiot |
| 4,470,207 A | 9/1984 | Bente |
| 4,476,980 A | 10/1984 | Giffard |
| 4,477,225 A | 10/1984 | Burkam |
| 4,503,393 A | 3/1985 | Moyer et al. |
| 4,504,193 A | 3/1985 | Mouille |
| 4,510,500 A | 4/1985 | Brune |
| 4,518,313 A | 5/1985 | Jensen et al. |
| 4,519,559 A | 5/1985 | Logan et al. |
| 4,537,258 A | 8/1985 | Beck |
| 4,543,014 A | 9/1985 | Brandi et al. |
| 4,549,850 A | 10/1985 | Vincent |
| 4,550,812 A | 11/1985 | Mard |
| 4,555,627 A | 11/1985 | Mcrae, Jr. |
| 4,566,856 A | 1/1986 | Miller |
| 4,569,541 A | 2/1986 | Eisenzimmer |
| 4,569,629 A | 2/1986 | Ferris et al. |
| 4,580,945 A | 4/1986 | Miller |
| 4,596,513 A | 6/1986 | Carlson et al. |
| 4,601,639 A | 7/1986 | Yen et al. |
| 4,607,313 A | 8/1986 | Shaw et al. |
| 4,610,017 A | 9/1986 | Perrier De La Bathie et al. |
| 4,635,066 A | 1/1987 | Gordon et al. |
| 4,645,423 A | 2/1987 | Ferris et al. |
| 4,650,401 A | 3/1987 | Yao et al. |
| 4,675,684 A | 6/1987 | Spence |
| 4,676,720 A | 6/1987 | Niwa et al. |
| 4,695,227 A | 9/1987 | Head et al. |
| 4,699,546 A | 10/1987 | Massarsch |
| 4,710,100 A | 12/1987 | Laing et al. |
| 4,713,498 A | 12/1987 | Ludwig et al. |
| 4,739,325 A | 4/1988 | Macleod |
| 4,739,866 A | 4/1988 | Reik et al. |
| 4,789,305 A | 12/1988 | Vaughen |
| 4,792,974 A | 12/1988 | Chace |
| 4,806,865 A | 2/1989 | Pury |
| 4,810,963 A | 3/1989 | Blake-Coleman et al. |
| 4,822,245 A | 4/1989 | Aubry et al. |
| 4,823,228 A | 4/1989 | Bittner |
| 4,853,543 A | 8/1989 | Ozdemir |
| 4,874,292 A | 10/1989 | Matuska et al. |
| 4,877,375 A | 10/1989 | Desjardins |
| 4,886,419 A | 12/1989 | Mccafferty |
| 4,893,988 A | 1/1990 | Sato |
| 4,904,199 A | 2/1990 | Ducassou |
| 4,915,585 A | 4/1990 | Guimbal |
| 4,938,136 A | 7/1990 | Gould |
| 4,939,460 A | 7/1990 | Patla et al. |
| 4,954,812 A | 9/1990 | Lebron |

(56) References Cited

U.S. PATENT DOCUMENTS

| | | |
|---|---|---|
| 4,983,153 A | 1/1991 | Luijten |
| 4,987,969 A | 1/1991 | Boyle et al. |
| 4,992,786 A | 2/1991 | Kirkland |
| 4,995,574 A | 2/1991 | Bernard et al. |
| 5,004,215 A | 4/1991 | Aubry et al. |
| 5,028,228 A | 7/1991 | Ubukata et al. |
| 5,029,092 A | 7/1991 | Funatsu |
| 5,029,480 A | 7/1991 | Kibblewhite |
| 5,042,967 A | 8/1991 | Desjardins |
| 5,068,669 A | 11/1991 | Koert et al. |
| 5,070,483 A | 12/1991 | Berni et al. |
| 5,081,468 A | 1/1992 | Williams |
| 5,094,407 A | 3/1992 | Jampy et al. |
| 5,099,430 A | 3/1992 | Hirsch |
| 5,099,911 A | 3/1992 | Vowles |
| 5,109,362 A | 4/1992 | Berni |
| 5,141,398 A | 8/1992 | Bietenhader et al. |
| 5,149,311 A | 9/1992 | Luijten |
| 5,165,853 A | 11/1992 | Pancotti |
| 5,174,552 A | 12/1992 | Hodgson et al. |
| 5,174,677 A | 12/1992 | Doolin et al. |
| 5,175,963 A | 1/1993 | Schafer et al. |
| 5,178,241 A | 1/1993 | Aubry |
| 5,189,620 A | 2/1993 | Parsons et al. |
| 5,208,504 A | 5/1993 | Parker et al. |
| 5,210,704 A | 5/1993 | Husseiny |
| 5,211,336 A | 5/1993 | Kaidonis et al. |
| 5,211,359 A | 5/1993 | Rene et al. |
| 5,214,585 A | 5/1993 | Ehrich |
| 5,219,430 A | 6/1993 | Antoine |
| 5,228,640 A | 7/1993 | Mouille |
| 5,228,834 A | 7/1993 | Yamamoto et al. |
| 5,242,130 A | 9/1993 | Mouille et al. |
| 5,244,190 A | 9/1993 | Bianchi |
| 5,258,709 A | 11/1993 | Laukien |
| 5,303,142 A | 4/1994 | Parsons et al. |
| 5,316,442 A | 5/1994 | Mouille |
| 5,323,861 A | 6/1994 | Kaidonis et al. |
| 5,334,932 A | 8/1994 | Nielsen |
| 5,358,381 A | 10/1994 | Covington et al. |
| 5,372,478 A | 12/1994 | Mccafferty |
| 5,381,692 A | 1/1995 | Winslow et al. |
| 5,402,964 A | 4/1995 | Wygnanski et al. |
| 5,407,386 A | 4/1995 | Kish et al. |
| 5,424,749 A | 6/1995 | Richmond |
| 5,431,538 A | 7/1995 | Schmaling et al. |
| 5,456,341 A | 10/1995 | Garnjost et al. |
| 5,459,813 A | 10/1995 | Klayman |
| 5,495,249 A | 2/1996 | Chazelle et al. |
| 5,562,415 A | 10/1996 | Legendre et al. |
| 5,606,737 A | 2/1997 | Suzuki et al. |
| 5,607,122 A | 3/1997 | Hicks et al. |
| 5,625,363 A | 4/1997 | Spilker |
| 5,627,311 A | 5/1997 | Nakaya et al. |
| 5,636,970 A | 6/1997 | Certain |
| 5,647,726 A | 7/1997 | Sehgal et al. |
| 5,654,518 A | 8/1997 | Dobbs |
| 5,654,723 A | 8/1997 | Craven et al. |
| 5,780,928 A | 7/1998 | Rostoker et al. |
| 5,788,372 A | 8/1998 | Jones et al. |
| 5,788,401 A | 8/1998 | Drenth |
| 5,799,900 A | 9/1998 | Mcdonnell |
| 5,802,184 A | 9/1998 | Heath |
| 5,811,664 A | 9/1998 | Whittington et al. |
| 5,812,097 A | 9/1998 | Maldonado |
| 5,814,963 A | 9/1998 | Girard et al. |
| 5,816,533 A | 10/1998 | Krysinsky |
| 5,844,525 A | 12/1998 | Hayes et al. |
| 5,846,908 A | 12/1998 | Nonomura et al. |
| 5,853,005 A | 12/1998 | Scanlon |
| 5,860,621 A | 1/1999 | Barquet et al. |
| 5,892,483 A | 4/1999 | Hayes et al. |
| 5,908,365 A | 6/1999 | Lajaunie et al. |
| 5,909,244 A | 6/1999 | Waxman et al. |
| 5,915,649 A | 6/1999 | Head |
| 5,928,300 A | 7/1999 | Rogers et al. |
| 5,932,940 A | 8/1999 | Nagle et al. |
| 5,936,552 A | 8/1999 | Wichgers et al. |
| 5,937,550 A | 8/1999 | Emrich |
| 5,962,781 A | 10/1999 | Veryaskin |
| 5,981,744 A | 11/1999 | Pozzo et al. |
| 5,990,847 A | 11/1999 | Filipovic et al. |
| 6,004,257 A | 12/1999 | Jacobson |
| 6,028,558 A | 2/2000 | Van Voorhies |
| 6,046,560 A | 4/2000 | Lu et al. |
| 6,063,527 A | 5/2000 | Nishikawa et al. |
| 6,067,853 A | 5/2000 | Thevenot |
| 6,069,090 A | 5/2000 | Eriguchi |
| 6,077,830 A | 6/2000 | Vertesy et al. |
| 6,082,671 A | 7/2000 | Michelson |
| 6,126,398 A | 10/2000 | Bauer et al. |
| 6,145,787 A | 11/2000 | Rolls |
| 6,158,690 A | 12/2000 | Wadey et al. |
| 6,167,794 B1 | 1/2001 | Kathe |
| 6,168,142 B1 | 1/2001 | Bolukbasi et al. |
| 6,189,836 B1 | 2/2001 | Gold et al. |
| 6,196,800 B1 | 3/2001 | Bauer et al. |
| 6,200,097 B1 | 3/2001 | Mouille |
| 6,215,454 B1 | 4/2001 | Tran |
| 6,244,538 B1 | 6/2001 | Howard et al. |
| 6,287,664 B1 | 9/2001 | Pratt |
| 6,382,556 B1 | 5/2002 | Pham |
| 6,386,035 B2 | 5/2002 | Janiaud et al. |
| 6,392,646 B1 | 5/2002 | Yamrom et al. |
| 6,417,601 B1 | 7/2002 | Kim |
| 6,427,815 B1 | 8/2002 | Zeller |
| 6,427,942 B2 | 8/2002 | Howard et al. |
| 6,431,169 B1 | 8/2002 | Do Val et al. |
| 6,433,755 B1 | 8/2002 | Kuramoto |
| 6,434,085 B1 | 8/2002 | Nedwell |
| 6,454,206 B2 | 9/2002 | Vincent |
| 6,467,599 B2 | 10/2002 | Oser et al. |
| 6,489,992 B2 | 12/2002 | Savoye |
| 6,524,625 B2 | 2/2003 | Aga et al. |
| 6,530,542 B2 | 3/2003 | Toulmay |
| 6,536,553 B1 | 3/2003 | Scanlon |
| 6,559,796 B1 | 5/2003 | Huber et al. |
| 6,589,912 B2 | 7/2003 | Kawai |
| 6,595,103 B1 | 7/2003 | Kathe |
| 6,607,161 B1 | 8/2003 | Krysinski et al. |
| 6,617,775 B1 | 9/2003 | Seward et al. |
| 6,646,605 B2 | 11/2003 | Mckinzie et al. |
| 6,655,631 B2 | 12/2003 | Austen-Brown |
| 6,661,897 B2 | 12/2003 | Smith |
| 6,676,074 B2 | 1/2004 | Zoppitelli et al. |
| 6,683,783 B1 | 1/2004 | Smalley et al. |
| 6,695,254 B2 | 2/2004 | Zoppitelli et al. |
| 6,712,313 B2 | 3/2004 | Zoppitelli et al. |
| 6,791,508 B2 | 9/2004 | Berry et al. |
| 6,824,096 B2 | 11/2004 | Zoppitelli et al. |
| 6,837,106 B2 | 1/2005 | Etkin et al. |
| 6,883,747 B2 | 4/2005 | Ratkovic et al. |
| 6,898,975 B2 | 5/2005 | Blunt |
| 6,907,813 B2 | 6/2005 | Gablowski |
| 6,914,580 B2 | 7/2005 | Leisten |
| 6,926,500 B2 | 8/2005 | Ferullo |
| 6,948,910 B2 | 9/2005 | Polacsek |
| 6,985,212 B2 | 1/2006 | Jamieson et al. |
| 6,990,360 B2 | 1/2006 | Berger et al. |
| 6,994,492 B2 | 2/2006 | Mcmillan et al. |
| 7,008,767 B2 | 3/2006 | Handelsman et al. |
| 7,027,953 B2 | 4/2006 | Klein |
| 7,073,415 B2 | 7/2006 | Casutt et al. |
| 7,111,829 B2 | 9/2006 | Delisle |
| 7,111,830 B2 | 9/2006 | Delisle |
| 7,141,812 B2 | 11/2006 | Appleby et al. |
| 7,164,117 B2 | 1/2007 | Breed et al. |
| 7,165,451 B1 | 1/2007 | Brooks et al. |
| 7,172,785 B2 | 2/2007 | Thompson et al. |
| 7,182,295 B2 | 2/2007 | Redmond |
| 7,195,200 B2 | 3/2007 | Yamane |
| 7,216,018 B2 | 5/2007 | Zuo et al. |
| 7,243,945 B2 | 7/2007 | Breed et al. |
| 7,262,429 B2 | 8/2007 | Taylor |

(56) References Cited

U.S. PATENT DOCUMENTS

| | | |
|---|---|---|
| 7,270,516 B2 | 9/2007 | Becker et al. |
| 7,288,222 B2 | 10/2007 | Matsumoto et al. |
| 7,293,960 B2 | 11/2007 | Yamamoto et al. |
| 7,317,301 B2 | 1/2008 | Angquist |
| 7,360,994 B2 | 4/2008 | Zoppitelli |
| 7,366,590 B2 | 4/2008 | Balasu |
| 7,375,529 B2 | 5/2008 | Dupuis et al. |
| 7,391,306 B2 | 6/2008 | Dufournier |
| 7,403,294 B2 | 7/2008 | Handman et al. |
| 7,415,126 B2 | 8/2008 | Breed et al. |
| 7,432,872 B1 | 10/2008 | Waller |
| 7,440,857 B2 | 10/2008 | Morel |
| 7,451,949 B2 | 11/2008 | Eglin |
| 7,458,419 B2 | 12/2008 | Nold, III et al. |
| 7,461,502 B2 | 12/2008 | Emsellem |
| 7,461,819 B2 | 12/2008 | Eglin |
| 7,471,708 B2 | 12/2008 | Besaucele et al. |
| 7,474,685 B2 | 1/2009 | Kalayeh |
| 7,476,724 B2 | 1/2009 | Dennis et al. |
| 7,477,571 B2 | 1/2009 | Melese et al. |
| 7,477,758 B2 | 1/2009 | Piirainen et al. |
| 7,494,315 B2 | 2/2009 | Hart |
| 7,511,833 B2 | 3/2009 | Breed |
| 7,513,489 B2 | 4/2009 | Delisle |
| 7,522,473 B2 | 4/2009 | Zlotnik et al. |
| 7,532,541 B2 | 5/2009 | Govindswamy et al. |
| 7,534,984 B2 | 5/2009 | Gleckler |
| 7,535,148 B2 | 5/2009 | Harris et al. |
| 7,561,096 B2 | 7/2009 | Hellsten |
| 7,566,881 B2 | 7/2009 | Parvin et al. |
| 7,596,242 B2 | 9/2009 | Breed et al. |
| 7,607,892 B2 | 10/2009 | Beroul |
| 7,616,771 B2 | 11/2009 | Lenhardt et al. |
| 7,631,835 B2 | 12/2009 | Ferrer |
| 7,642,741 B2 | 1/2010 | Sidman |
| 7,646,347 B2 | 1/2010 | Ying |
| 7,663,502 B2 | 2/2010 | Breed |
| 7,668,797 B2 | 2/2010 | Kuvich |
| 7,673,558 B2 | 3/2010 | Panesar et al. |
| 7,674,605 B2 | 3/2010 | Lin et al. |
| 7,676,062 B2 | 3/2010 | Breed et al. |
| 7,692,571 B2 | 4/2010 | Lovberg et al. |
| 7,717,368 B2 | 5/2010 | Yoeli |
| 7,719,416 B2 | 5/2010 | Arms et al. |
| 7,719,463 B2 | 5/2010 | Migliaccio et al. |
| 7,720,582 B2 | 5/2010 | Makinadjian |
| 7,723,321 B2 | 5/2010 | Hanazawa et al. |
| 7,724,137 B2 | 5/2010 | Page |
| 7,738,678 B2 | 6/2010 | Breed et al. |
| 7,740,206 B2 | 6/2010 | Eaton et al. |
| 7,751,112 B2 | 7/2010 | Bowers et al. |
| 7,766,602 B1 | 8/2010 | Stroburg |
| 7,767,398 B2 | 8/2010 | Barden et al. |
| 7,768,380 B2 | 8/2010 | Breed et al. |
| 7,770,843 B2 | 8/2010 | Bietenhader |
| 7,794,341 B2 | 9/2010 | Tarng et al. |
| 7,799,899 B2 | 9/2010 | Varfolomeev et al. |
| 7,801,686 B2 | 9/2010 | Hyde et al. |
| 7,822,415 B2 | 10/2010 | Meyers et al. |
| 7,827,042 B2 | 11/2010 | Jung et al. |
| 7,832,137 B2 | 11/2010 | Sammut et al. |
| 7,839,058 B1 | 11/2010 | Churchill et al. |
| 7,846,400 B2 | 12/2010 | Hyde et al. |
| 7,856,750 B2 | 12/2010 | Sammut et al. |
| 7,883,609 B2 | 2/2011 | Petrenko et al. |
| 7,886,866 B2 | 2/2011 | Fullerton |
| 7,887,113 B2 | 2/2011 | Lambarth et al. |
| 7,902,719 B2 | 3/2011 | Hull |
| 7,906,191 B2 | 3/2011 | Pratt |
| 7,914,383 B2 | 3/2011 | Vignal |
| 7,918,100 B2 | 4/2011 | Breed et al. |
| 7,918,417 B2 | 4/2011 | Mouille |
| 7,927,787 B2 | 4/2011 | Jung et al. |
| 7,932,925 B2 | 4/2011 | Inbar et al. |
| 7,937,878 B2 | 5/2011 | Sammut et al. |
| 7,937,945 B2 | 5/2011 | Kinde, Sr. |
| 7,939,667 B2 | 5/2011 | Rancourt et al. |
| 7,940,937 B2 | 5/2011 | Smith |
| 7,962,285 B2 | 6/2011 | Breed |
| 7,968,212 B2 | 6/2011 | Senkfor et al. |
| 7,972,390 B2 | 7/2011 | Blum et al. |
| 7,974,787 B2 | 7/2011 | Hyde et al. |
| 8,020,428 B2 | 9/2011 | Snieder |
| 8,031,838 B2 | 10/2011 | Bowers et al. |
| 8,033,211 B2 | 10/2011 | Halliday et al. |
| 8,048,274 B2 | 11/2011 | Brooks et al. |
| 8,055,454 B2 | 11/2011 | Cohen et al. |
| 8,070,089 B2 | 12/2011 | Ferrier |
| 8,087,347 B2 | 1/2012 | Halliday et al. |
| 8,095,268 B2 | 1/2012 | Parison et al. |
| 8,096,722 B2 | 1/2012 | Rolion et al. |
| 8,104,345 B2 | 1/2012 | Brckl et al. |
| 8,113,904 B1 | 2/2012 | Walterscheid |
| 8,115,622 B2 | 2/2012 | Stolarczyk et al. |
| 8,115,646 B2 | 2/2012 | Tanielian et al. |
| 8,123,483 B2 | 2/2012 | Beroul |
| 8,128,361 B2 | 3/2012 | Dawson et al. |
| 8,130,904 B2 | 3/2012 | Bowers et al. |
| 8,142,682 B2 | 3/2012 | Kasch et al. |
| 8,157,383 B2 | 4/2012 | Scanlon |
| 8,158,432 B2 | 4/2012 | Grof et al. |
| 8,162,098 B2 | 4/2012 | Emery et al. |
| 8,181,755 B2 | 5/2012 | Campbell et al. |
| 8,189,839 B2 | 5/2012 | Lenhardt et al. |
| 8,189,860 B2 | 5/2012 | Thyagarajan et al. |
| 8,226,364 B2 | 7/2012 | Manfredotti et al. |
| 8,229,163 B2 | 7/2012 | Coleman et al. |
| 8,256,089 B2 | 9/2012 | Pionetti |
| 8,266,333 B1 | 9/2012 | Wade et al. |
| 8,275,140 B2 | 9/2012 | Smith |
| 8,278,418 B2 | 10/2012 | Tian et al. |
| 8,284,967 B2 | 10/2012 | Yang et al. |
| 8,286,908 B2 | 10/2012 | Brieger et al. |
| 8,297,928 B2 | 10/2012 | Manfredotti et al. |
| 8,339,810 B2 | 12/2012 | Ratnaparkhi et al. |
| 8,340,944 B2 | 12/2012 | Jung et al. |
| 8,362,319 B2 | 1/2013 | Andre et al. |
| 8,378,068 B2 | 2/2013 | Dasseux et al. |
| 8,384,043 B2 | 2/2013 | Hyde et al. |
| 8,403,106 B2 | 3/2013 | Bostick |
| 8,408,359 B2 | 4/2013 | Lu et al. |
| 8,413,772 B2 | 4/2013 | Wereley et al. |
| 8,413,923 B2 | 4/2013 | Brenner et al. |
| 8,427,649 B2 | 4/2013 | Hays et al. |
| 8,436,609 B2 | 5/2013 | Smka et al. |
| 8,439,303 B2 | 5/2013 | Koletzko |
| 8,445,222 B2 | 5/2013 | Spinale et al. |
| 8,450,307 B2 | 5/2013 | Sargent et al. |
| 8,456,159 B2 | 6/2013 | Polzer et al. |
| 8,457,341 B2 | 6/2013 | Danley |
| 8,466,180 B2 | 6/2013 | Jung et al. |
| 8,469,164 B2 | 6/2013 | Kondo et al. |
| 8,469,667 B2 | 6/2013 | Girard |
| 8,483,908 B2 | 7/2013 | Carresj et al. |
| 8,496,200 B2 | 7/2013 | Yoeli |
| 8,499,907 B2 | 8/2013 | Smith et al. |
| 8,507,410 B2 | 8/2013 | Fusaka |
| 8,508,402 B2 | 8/2013 | Duran Toro et al. |
| 8,509,965 B2 | 8/2013 | Lin |
| 8,532,845 B2 | 9/2013 | Eberhard |
| 8,534,418 B2 | 9/2013 | Pachale |
| 8,548,648 B2 | 10/2013 | Sahasrabudhe et al. |
| 8,555,726 B2 | 10/2013 | Barger et al. |
| 8,557,272 B2 | 10/2013 | Zhao |
| 8,561,945 B2 | 10/2013 | Engleder et al. |
| 8,581,306 B2 | 11/2013 | Blick et al. |
| 8,581,772 B2 | 11/2013 | Long et al. |
| 8,586,090 B2 | 11/2013 | Dadachova et al. |
| 8,589,151 B2 | 11/2013 | Chamberlain |
| 8,594,458 B2 | 11/2013 | Wiesenfarth |
| 8,602,400 B2 | 12/2013 | Ward et al. |
| 8,606,592 B2 | 12/2013 | Hyde et al. |
| 9,734,726 B2 | 8/2017 | Enns et al. |
| 2002/0007687 A1 | 1/2002 | Zimmermann et al. |

(56) References Cited

U.S. PATENT DOCUMENTS

| | | |
|---|---|---|
| 2002/0074559 A1 | 6/2002 | Dowling et al. |
| 2002/0083805 A1 | 7/2002 | Lundblad |
| 2002/0102196 A1 | 8/2002 | Smalley et al. |
| 2003/0045200 A1 | 3/2003 | Tarng et al. |
| 2003/0132341 A1 | 7/2003 | Glomstad et al. |
| 2003/0183722 A1 | 10/2003 | Zoppitelli et al. |
| 2003/0188740 A1 | 10/2003 | Tribelsky et al. |
| 2003/0214259 A9 | 11/2003 | Dowling et al. |
| 2004/0120844 A1 | 6/2004 | Tribelsky et al. |
| 2004/0186214 A1 | 9/2004 | Li et al. |
| 2004/0211322 A1 | 10/2004 | Halliday et al. |
| 2005/0040809 A1 | 2/2005 | Uber et al. |
| 2005/0257827 A1 | 11/2005 | Gaudiana et al. |
| 2005/0268962 A1 | 12/2005 | Gaudiana et al. |
| 2006/0005876 A1 | 1/2006 | Gaudiana et al. |
| 2006/0027709 A1 | 2/2006 | Pinto |
| 2006/0063982 A1 | 3/2006 | Sullivan et al. |
| 2006/0248617 A1 | 11/2006 | Imanaka et al. |
| 2006/0248954 A1 | 11/2006 | Snieder |
| 2006/0268947 A1 | 11/2006 | Kalayeh |
| 2006/0288866 A1 | 12/2006 | Cleckler et al. |
| 2007/0006652 A1 | 1/2007 | Weldon et al. |
| 2007/0012818 A1 | 1/2007 | Miyazawa et al. |
| 2007/0025597 A1 | 2/2007 | Breed et al. |
| 2007/0035114 A1 | 2/2007 | Breed et al. |
| 2007/0060623 A1 | 3/2007 | Kajino et al. |
| 2007/0068605 A1 | 3/2007 | Statnikov |
| 2007/0110578 A1 | 5/2007 | Stommel |
| 2007/0111281 A1 | 5/2007 | Sondermann et al. |
| 2007/0124175 A1 | 5/2007 | Jung et al. |
| 2007/0124176 A1 | 5/2007 | Jung et al. |
| 2007/0128235 A1 | 6/2007 | Shinoda et al. |
| 2007/0154063 A1 | 7/2007 | Breed |
| 2007/0196616 A1 | 8/2007 | Stalder et al. |
| 2007/0219237 A1 | 9/2007 | Matsumoto et al. |
| 2007/0221783 A1 | 9/2007 | Parks et al. |
| 2007/0249629 A1 | 10/2007 | Beaulieu et al. |
| 2008/0004905 A1 | 1/2008 | Jung et al. |
| 2008/0004909 A1 | 1/2008 | Jung et al. |
| 2008/0011091 A1 | 1/2008 | Weldon |
| 2008/0020935 A1 | 1/2008 | Volfson |
| 2008/0033763 A1 | 2/2008 | Jung et al. |
| 2008/0047329 A1 | 2/2008 | Breed |
| 2008/0052114 A1 | 2/2008 | Jung et al. |
| 2008/0062856 A1 | 3/2008 | Feher |
| 2008/0071789 A1 | 3/2008 | Kwasiborski |
| 2008/0082272 A1 | 4/2008 | Jung et al. |
| 2008/0103746 A1 | 5/2008 | Jung et al. |
| 2008/0154629 A1 | 6/2008 | Breed et al. |
| 2008/0157510 A1 | 7/2008 | Breed et al. |
| 2008/0173754 A1 | 7/2008 | Strehlow et al. |
| 2008/0178692 A1 | 7/2008 | Jung et al. |
| 2008/0180259 A1 | 7/2008 | Jung et al. |
| 2008/0181816 A1 | 7/2008 | Jung et al. |
| 2008/0181821 A1 | 7/2008 | Jung et al. |
| 2008/0193919 A1 | 8/2008 | Jung et al. |
| 2008/0207338 A1 | 8/2008 | Mende et al. |
| 2008/0210720 A1 | 9/2008 | Teng et al. |
| 2008/0234899 A1 | 9/2008 | Breed et al. |
| 2008/0241000 A1 | 10/2008 | Jung et al. |
| 2008/0241909 A1 | 10/2008 | Jung et al. |
| 2008/0241910 A1 | 10/2008 | Jung et al. |
| 2008/0242949 A1 | 10/2008 | Jung et al. |
| 2008/0243005 A1 | 10/2008 | Jung et al. |
| 2008/0245740 A1 | 10/2008 | Jung et al. |
| 2008/0283290 A1 | 11/2008 | Niino et al. |
| 2009/0018407 A1 | 1/2009 | Jung et al. |
| 2009/0024050 A1 | 1/2009 | Jung et al. |
| 2009/0036321 A1 | 2/2009 | Moler et al. |
| 2009/0044814 A1 | 2/2009 | Iancea et al. |
| 2009/0050569 A1 | 2/2009 | Jung et al. |
| 2009/0055102 A1 | 2/2009 | Laufer et al. |
| 2009/0110933 A1 | 4/2009 | Hyde et al. |
| 2009/0112193 A1 | 4/2009 | Hyde et al. |
| 2009/0112197 A1 | 4/2009 | Hyde et al. |
| 2009/0131793 A1 | 5/2009 | Stonefield et al. |
| 2009/0157057 A1 | 6/2009 | Ferren et al. |
| 2009/0159382 A1 | 6/2009 | Chemouni et al. |
| 2009/0172834 A1 | 7/2009 | Schauwecker et al. |
| 2009/0212475 A1 | 8/2009 | Tropf |
| 2009/0215157 A1 | 8/2009 | Jung et al. |
| 2009/0246528 A1 | 10/2009 | Istvan |
| 2009/0259112 A1 | 10/2009 | Hyde et al. |
| 2009/0259217 A1 | 10/2009 | Hyde et al. |
| 2009/0270687 A1 | 10/2009 | Hyde et al. |
| 2009/0270694 A1 | 10/2009 | Hyde et al. |
| 2009/0271122 A1 | 10/2009 | Hyde et al. |
| 2009/0271347 A1 | 10/2009 | Hyde et al. |
| 2009/0271375 A1 | 10/2009 | Hyde et al. |
| 2009/0287093 A1 | 11/2009 | Ferren et al. |
| 2009/0287101 A1 | 11/2009 | Ferren et al. |
| 2009/0287109 A1 | 11/2009 | Ferren et al. |
| 2009/0287120 A1 | 11/2009 | Ferren et al. |
| 2009/0287191 A1 | 11/2009 | Ferren et al. |
| 2009/0292212 A1 | 11/2009 | Ferren et al. |
| 2009/0292213 A1 | 11/2009 | Ferren et al. |
| 2009/0292214 A1 | 11/2009 | Ferren et al. |
| 2009/0292222 A1 | 11/2009 | Ferren et al. |
| 2009/0312595 A1 | 12/2009 | Leuthardt et al. |
| 2009/0312668 A1 | 12/2009 | Leuthardt et al. |
| 2009/0318773 A1 | 12/2009 | Jung et al. |
| 2010/0004404 A1 | 1/2010 | Suzuki et al. |
| 2010/0004762 A1 | 1/2010 | Leuthardt et al. |
| 2010/0012653 A1 | 1/2010 | Ulrich et al. |
| 2010/0015583 A1 | 1/2010 | Leuthardt et al. |
| 2010/0017001 A1 | 1/2010 | Leuthardt et al. |
| 2010/0022820 A1 | 1/2010 | Leuthardt et al. |
| 2010/0030089 A1 | 2/2010 | Hyde et al. |
| 2010/0036209 A1 | 2/2010 | Ferren et al. |
| 2010/0036263 A1 | 2/2010 | Ferren et al. |
| 2010/0041958 A1 | 2/2010 | Leuthardt et al. |
| 2010/0041964 A1 | 2/2010 | Hyde et al. |
| 2010/0042578 A1 | 2/2010 | Leuthardt et al. |
| 2010/0044506 A1 | 2/2010 | Smith et al. |
| 2010/0054545 A1 | 3/2010 | Elliott |
| 2010/0063368 A1 | 3/2010 | Leuthardt et al. |
| 2010/0066561 A1 | 3/2010 | Ulrich et al. |
| 2010/0069724 A1 | 3/2010 | Leuthardt et al. |
| 2010/0076249 A1 | 3/2010 | Leuthardt et al. |
| 2010/0081190 A1 | 4/2010 | Hyde et al. |
| 2010/0081860 A1 | 4/2010 | Leuthardt et al. |
| 2010/0081861 A1 | 4/2010 | Leuthardt et al. |
| 2010/0081915 A1 | 4/2010 | Hyde et al. |
| 2010/0081916 A1 | 4/2010 | Hyde et al. |
| 2010/0081919 A1 | 4/2010 | Hyde et al. |
| 2010/0081923 A1 | 4/2010 | Hyde et al. |
| 2010/0081924 A1 | 4/2010 | Hyde et al. |
| 2010/0081925 A1 | 4/2010 | Hyde et al. |
| 2010/0081926 A1 | 4/2010 | Hyde et al. |
| 2010/0081927 A1 | 4/2010 | Hyde et al. |
| 2010/0081928 A1 | 4/2010 | Hyde et al. |
| 2010/0100036 A1 | 4/2010 | Leuthardt et al. |
| 2010/0101206 A1 | 4/2010 | Haehner et al. |
| 2010/0125561 A1 | 5/2010 | Leuthardt et al. |
| 2010/0130811 A1 | 5/2010 | Leuthardt et al. |
| 2010/0144451 A1 | 6/2010 | Lawrie |
| 2010/0149434 A1 | 6/2010 | Desaulniers |
| 2010/0161231 A1 | 6/2010 | Atila |
| 2010/0163027 A1 | 7/2010 | Hyde et al. |
| 2010/0163036 A1 | 7/2010 | Hyde et al. |
| 2010/0168525 A1 | 7/2010 | Hyde et al. |
| 2010/0168529 A1 | 7/2010 | Hyde et al. |
| 2010/0210745 A1 | 8/2010 | Mcdaniel et al. |
| 2010/0226785 A1 | 9/2010 | Livingston et al. |
| 2010/0233146 A1 | 9/2010 | Mcdaniel |
| 2010/0241449 A1 | 9/2010 | Rinaldo, Jr. et al. |
| 2010/0256874 A1 | 10/2010 | Carresj et al. |
| 2010/0268057 A1 | 10/2010 | Rinaldo, Jr. et al. |
| 2010/0274441 A1 | 10/2010 | Carresjo |
| 2010/0274577 A1 | 10/2010 | Rinaldo, Jr. et al. |
| 2010/0280332 A1 | 11/2010 | Hyde et al. |
| 2010/0298257 A1 | 11/2010 | Ross et al. |
| 2010/0298305 A1 | 11/2010 | Capehart |
| 2010/0305962 A1 | 12/2010 | Rinaldo, Jr. et al. |

(56) References Cited

U.S. PATENT DOCUMENTS

| | | |
|---|---|---|
| 2010/0311325 A1 | 12/2010 | Marshall |
| 2010/0312579 A1 | 12/2010 | Rinaldo, Jr. et al. |
| 2011/0053173 A1 | 3/2011 | Hood et al. |
| 2011/0079166 A1 | 4/2011 | Popa-Simil |
| 2011/0105473 A1 | 5/2011 | Vendeville et al. |
| 2011/0108312 A1 | 5/2011 | Becze et al. |
| 2011/0145009 A1 | 6/2011 | Jung et al. |
| 2011/0158806 A1 | 6/2011 | Arms et al. |
| 2011/0174554 A1 | 7/2011 | Lee et al. |
| 2011/0182970 A1 | 7/2011 | Hyde et al. |
| 2011/0187102 A1 | 8/2011 | Sirseth |
| 2011/0190604 A1 | 8/2011 | Hyde et al. |
| 2011/0208361 A1 | 8/2011 | Hildebrand et al. |
| 2011/0221900 A1 | 9/2011 | Reich |
| 2011/0240042 A1 | 10/2011 | Cooke et al. |
| 2011/0240064 A1 | 10/2011 | Wales et al. |
| 2011/0245484 A1 | 10/2011 | Ross et al. |
| 2011/0267222 A1 | 11/2011 | Craig |
| 2011/0308709 A1 | 12/2011 | Quellette |
| 2012/0031193 A1 | 2/2012 | Adams et al. |
| 2012/0034833 A1 | 2/2012 | Schaube et al. |
| 2012/0039712 A1 | 2/2012 | Ueno |
| 2012/0086284 A1 | 4/2012 | Schatz et al. |
| 2012/0112535 A1 | 5/2012 | Karalis et al. |
| 2012/0122679 A1 | 5/2012 | Zhang et al. |
| 2012/0122680 A1 | 5/2012 | Holyoke, Jr. et al. |
| 2012/0184456 A1 | 7/2012 | Jung et al. |
| 2012/0194418 A1 | 8/2012 | Osterhout et al. |
| 2012/0207320 A1 | 8/2012 | Avital |
| 2012/0207600 A1 | 8/2012 | Harris et al. |
| 2012/0212484 A1 | 8/2012 | Haddick et al. |
| 2012/0227389 A1 | 9/2012 | Hinderks |
| 2012/0235887 A1 | 9/2012 | Border et al. |
| 2012/0238689 A1 | 9/2012 | Sun et al. |
| 2012/0245284 A1 | 9/2012 | Leong et al. |
| 2012/0264884 A1 | 10/2012 | Liu et al. |
| 2012/0265546 A1 | 10/2012 | Hwang et al. |
| 2012/0265547 A1 | 10/2012 | Hwang et al. |
| 2012/0265548 A1 | 10/2012 | Hwang et al. |
| 2012/0288373 A1 | 11/2012 | Duong et al. |
| 2013/0008997 A1 | 1/2013 | Gentile |
| 2013/0028433 A1 | 1/2013 | Smith |
| 2013/0046153 A1 | 2/2013 | Hyde et al. |
| 2013/0083960 A1 | 4/2013 | Kostrzewski et al. |
| 2013/0248650 A1 | 9/2013 | Gorlich et al. |
| 2013/0314303 A1 | 11/2013 | Osterhout et al. |
| 2013/0338367 A1 | 12/2013 | Numata et al. |
| 2014/0035441 A1 | 2/2014 | Ichikawa |
| 2014/0044789 A1 | 2/2014 | Dadachova et al. |
| 2014/0070943 A1 | 3/2014 | Breed |
| 2014/0090937 A1 | 4/2014 | Wereley et al. |
| 2014/0103158 A1 | 4/2014 | Berry |
| 2014/0151438 A1 | 6/2014 | Fleck et al. |
| 2014/0166751 A1 | 6/2014 | Sammut et al. |
| 2014/0196631 A1 | 7/2014 | Mcdaniel |
| 2014/0265555 A1 | 9/2014 | Hall et al. |
| 2014/0349637 A1 | 11/2014 | Hyde et al. |
| 2014/0361627 A1 | 12/2014 | Kurs et al. |
| 2015/0057354 A1 | 2/2015 | Hoffman |
| 2015/0083863 A1 | 3/2015 | Karthuser et al. |
| 2015/0091503 A1 | 4/2015 | Hyde et al. |
| 2015/0091507 A1 | 4/2015 | Hyde et al. |
| 2015/0093245 A1 | 4/2015 | Fuhrer et al. |
| 2015/0094867 A1 | 4/2015 | Hyde et al. |
| 2015/0095114 A1 | 4/2015 | Hyde et al. |
| 2015/0095115 A1 | 4/2015 | Hyde et al. |
| 2015/0134345 A1 | 5/2015 | Hyde et al. |
| 2015/0140396 A1 | 5/2015 | Yamazaki |
| 2015/0140400 A1 | 5/2015 | Yamazaki et al. |
| 2015/0232560 A1 | 8/2015 | Heindl et al. |
| 2015/0236546 A1 | 8/2015 | Kesler et al. |
| 2015/0255994 A1 | 9/2015 | Kesler et al. |
| 2015/0260095 A1 | 9/2015 | Hinderks |
| 2015/0272195 A1 | 10/2015 | Tegreene et al. |
| 2015/0277397 A1 | 10/2015 | Tegreene et al. |
| 2015/0278431 A1 | 10/2015 | Wood, Jr. et al. |
| 2015/0278455 A1 | 10/2015 | Wood, Jr. et al. |
| 2015/0278481 A1 | 10/2015 | Tegreene et al. |
| 2015/0279173 A1 | 10/2015 | Tegreene et al. |
| 2015/0279174 A1 | 10/2015 | Tegreene et al. |
| 2015/0279175 A1 | 10/2015 | Tegreene et al. |
| 2015/0279176 A1 | 10/2015 | Tegreene et al. |
| 2015/0279177 A1 | 10/2015 | Tegreene et al. |
| 2015/0279178 A1 | 10/2015 | Tegreene et al. |
| 2015/0290419 A1 | 10/2015 | Kare et al. |
| 2015/0294085 A1 | 10/2015 | Kare et al. |
| 2015/0294086 A1 | 10/2015 | Kare et al. |
| 2015/0307203 A1 | 10/2015 | Litwinowicz et al. |
| 2015/0369328 A1 | 12/2015 | Sautier et al. |
| 2016/0023772 A1 | 1/2016 | Borigo et al. |
| 2016/0043571 A1 | 2/2016 | Kesler et al. |
| 2016/0049839 A1 | 2/2016 | Paiva et al. |
| 2016/0052621 A1 | 2/2016 | Ireland et al. |
| 2016/0059960 A1 | 3/2016 | Fearn et al. |
| 2016/0086108 A1 | 3/2016 | Abelow |
| 2016/0090642 A1 | 3/2016 | Sloan |
| 2016/0144734 A1 | 5/2016 | Wang et al. |
| 2016/0168552 A1 | 6/2016 | Blum et al. |
| 2016/0178464 A1 | 6/2016 | Burns et al. |
| 2016/0252325 A1 | 9/2016 | Sammut et al. |
| 2016/0269011 A1 | 9/2016 | Uehara et al. |
| 2016/0297545 A1 | 10/2016 | Yang et al. |
| 2016/0376003 A1 | 12/2016 | Feldman |
| 2017/0002475 A1 | 1/2017 | Strobl et al. |
| 2017/0024537 A1 | 1/2017 | Ferlito |
| 2017/0033433 A1 | 2/2017 | Winkelmann et al. |
| 2017/0117875 A1 | 4/2017 | Nomura et al. |
| 2017/0231560 A1 | 8/2017 | Hyde et al. |
| 2017/0276694 A1 | 9/2017 | Uehara |
| 2017/0293297 A1 | 10/2017 | Kim et al. |
| 2017/0301980 A1 | 10/2017 | Lavin et al. |
| 2017/0307672 A9 | 10/2017 | Vail et al. |
| 2017/0316133 A1 | 11/2017 | Abramov |
| 2017/0320564 A1 | 11/2017 | Kuzikov |
| 2017/0326934 A1 | 11/2017 | Wehr et al. |
| 2017/0369159 A1 | 12/2017 | Fink |
| 2017/0373382 A1 | 12/2017 | Maingot |
| 2018/0002005 A1 | 1/2018 | Groenewald |
| 2018/0023479 A1 | 1/2018 | Clauson et al. |
| 2018/0028431 A1 | 2/2018 | Chiattello et al. |
| 2018/0035606 A1 | 2/2018 | Burdoucci |
| 2018/0067003 A1 | 3/2018 | Michiwaki |
| 2018/0073876 A1 | 3/2018 | Paduano et al. |
| 2018/0081075 A1 | 3/2018 | Smiarowski et al. |
| 2018/0085490 A1 | 3/2018 | Kay et al. |
| 2018/0089394 A1 | 3/2018 | Hyde et al. |
| 2018/0111967 A1 | 4/2018 | Liu et al. |
| 2018/0117508 A1 | 5/2018 | Paluszewski et al. |
| 2018/0134387 A1 | 5/2018 | Kovac et al. |
| 2018/0157252 A1 | 6/2018 | Lee et al. |
| 2018/0197636 A1 | 7/2018 | Rinaldo, Jr. et al. |
| 2018/0198408 A1 | 7/2018 | Owaki et al. |
| 2018/0206730 A1 | 7/2018 | Abreu |
| 2018/0224278 A1 | 8/2018 | Furuhata |
| 2018/0253074 A1 | 9/2018 | Cella et al. |
| 2018/0265188 A1 | 9/2018 | Honnorat et al. |
| 2018/0266394 A1 | 9/2018 | Abramov |
| 2018/0275685 A1 | 9/2018 | Kim et al. |
| 2018/0294870 A1 | 10/2018 | Van Wynsberghe |
| 2018/0310564 A1 | 11/2018 | Hasegawa et al. |
| 2018/0319487 A1 | 11/2018 | Maier |
| 2018/0328935 A1 | 11/2018 | Hellinga et al. |
| 2018/0334248 A1 | 11/2018 | Neiser |
| 2018/0339324 A1 | 11/2018 | Reyes et al. |
| 2018/0356507 A1 | 12/2018 | Ichinose et al. |
| 2018/0358842 A1 | 12/2018 | Kanno |
| 2018/0364217 A1 | 12/2018 | Hellinga et al. |
| 2018/0370642 A1 | 12/2018 | Imaizumi et al. |
| 2018/0375376 A1 | 12/2018 | Kanno |
| 2019/0016449 A1 | 1/2019 | Imaizumi et al. |
| 2019/0023380 A1 | 1/2019 | Prud'Homme Lacroix et al. |
| 2019/0025805 A1 | 1/2019 | Cella et al. |
| 2019/0027974 A1 | 1/2019 | Kanno |
| 2019/0033441 A1 | 1/2019 | Valds et al. |

(56) References Cited

U.S. PATENT DOCUMENTS

| | | | |
|---|---|---|---|
| 2019/0034868 A1 | 1/2019 | Konanur et al. | |
| 2019/0076584 A1 | 3/2019 | Hyde et al. | |
| 2019/0094849 A1 | 3/2019 | Kim et al. | |
| 2019/0107590 A1 | 4/2019 | Fukushima et al. | |
| 2019/0108472 A1 | 4/2019 | Sweeney et al. | |
| 2019/0109656 A1 | 4/2019 | Tin | |
| 2019/0154439 A1 | 5/2019 | Binder | |
| 2019/0156600 A1 | 5/2019 | Potyrailo et al. | |
| 2019/0160591 A1 | 5/2019 | Kurosawa | |
| 2019/0168877 A1 | 6/2019 | Agajanian | |
| 2019/0187171 A1 | 6/2019 | Takizawa | |
| 2019/0191284 A1 | 6/2019 | Tran et al. | |
| 2019/0225665 A1 | 7/2019 | Mendoza et al. | |
| 2019/0227538 A1 | 7/2019 | Lassini et al. | |
| 2019/0227826 A1 | 7/2019 | Taylor et al. | |
| 2019/0229706 A1 | 7/2019 | Ogura et al. | |
| 2021/0247781 A1 | 8/2021 | Liu et al. | |
| 2023/0202676 A1* | 6/2023 | Donnelly | B64C 25/001 701/18 |

FOREIGN PATENT DOCUMENTS

| | | | |
|---|---|---|---|
| CA | 2809157 A1 | 12/2013 | |
| CA | 2980860 A1 | 11/2017 | |
| CA | 3056459 A1 | 3/2020 | |
| CH | 711738 A1 | 5/2017 | |
| CN | 1994819 A | 7/2007 | |
| CN | 102009745 A | 4/2011 | |
| CN | 201873920 U | 6/2011 | |
| CN | 102278413 A | 12/2011 | |
| CN | 102501970 A | 6/2012 | |
| CN | 202358301 U | 8/2012 | |
| CN | 102700710 A | 10/2012 | |
| CN | 102700711 A | 10/2012 | |
| CN | 102722612 A | 10/2012 | |
| CN | 102829079 A | 12/2012 | |
| CN | 202597572 U | 12/2012 | |
| CN | 202833642 U | 3/2013 | |
| CN | 203111500 U | 8/2013 | |
| CN | 103708031 A | 4/2014 | |
| CN | 203514146 U | 4/2014 | |
| CN | 103884285 A | 6/2014 | |
| CN | 104217072 A | 12/2014 | |
| CN | 104217106 A | 12/2014 | |
| CN | 104236881 A | 12/2014 | |
| CN | 104239608 A | 12/2014 | |
| CN | 104317981 A | 1/2015 | |
| CN | 104632885 A | 5/2015 | |
| CN | 104670492 A | 6/2015 | |
| CN | 104765975 A | 7/2015 | |
| CN | 104787357 A | 7/2015 | |
| CN | 104890867 A | 9/2015 | |
| CN | 104951591 A | 9/2015 | |
| CN | 105005637 A | 10/2015 | |
| CN | 105015766 A | 11/2015 | |
| CN | 205315489 U | 6/2016 | |
| CN | 105757118 A | 7/2016 | |
| CN | 205636526 U | 10/2016 | |
| CN | 106114830 A | 11/2016 | |
| CN | 106599403 A | 4/2017 | |
| CN | 106697292 A | 5/2017 | |
| CN | 107472519 A | 12/2017 | |
| CN | 206978543 U | 2/2018 | |
| CN | 108087477 A | 5/2018 | |
| CN | 108108531 A | 6/2018 | |
| CN | 108168804 A | 6/2018 | |
| CN | 108297622 A | 7/2018 | |
| CN | 108454834 A | 8/2018 | |
| CN | 207799370 U | 8/2018 | |
| CN | 108583852 A | 9/2018 | |
| CN | 207826531 U | 9/2018 | |
| CN | 108839817 A | 11/2018 | |
| CN | 108910082 A | 11/2018 | |
| CN | 109186922 A | 1/2019 | |
| CN | 109236918 A | 1/2019 | |
| CN | 208344531 U | 1/2019 | |
| CN | 208359839 U | 1/2019 | |
| CN | 208412108 U | 1/2019 | |
| CN | 109470435 A | 3/2019 | |
| CN | 109522637 A | 3/2019 | |
| CN | 109540486 A | 3/2019 | |
| CN | 208789925 U | 4/2019 | |
| CN | 109814161 A | 5/2019 | |
| CN | 109866917 A | 6/2019 | |
| CN | 109917478 A | 6/2019 | |
| CN | 110107646 A | 8/2019 | |
| CN | 110158491 A | 8/2019 | |
| CN | 209192225 U | 8/2019 | |
| CN | 209382265 U | 9/2019 | |
| CN | 209382266 U | 9/2019 | |
| CN | 209454981 U | 10/2019 | |
| CN | 209617461 U | 11/2019 | |
| CN | 110528374 A | 12/2019 | |
| CN | 110789711 A | 2/2020 | |
| CN | 210766451 U | 6/2020 | |
| CN | 111392066 A | 7/2020 | |
| CN | 111439376 A | 7/2020 | |
| CN | 111638017 A | 9/2020 | |
| CN | 111750022 A | 10/2020 | |
| CN | 111792028 A | 10/2020 | |
| CN | 112182755 A | 1/2021 | |
| CN | 212332957 U | 1/2021 | |
| CN | 212332966 U | 1/2021 | |
| DE | 202007010854 U1 | 11/2007 | |
| DE | 102019109615 A1 | 1/2020 | |
| EP | 0009767 A2 | 4/1980 | |
| EP | 0176466 A1 | 4/1986 | |
| EP | 0861777 A1 | 9/1998 | |
| EP | 1226271 A2 | 7/2002 | |
| EP | 1658222 A2 | 5/2006 | |
| EP | 2061814 A2 | 5/2009 | |
| EP | 2684799 A1 | 1/2014 | |
| EP | 3269737 A1 | 1/2018 | |
| EP | 3702271 A1 | 9/2020 | |
| FR | 936775 A | 7/1948 | |
| FR | 1082704 A | 12/1954 | |
| FR | 1301615 A | 8/1962 | |
| FR | 1588376 A | 4/1970 | |
| FR | 2236725 A1 | 2/1975 | |
| FR | 2427251 A1 | 12/1979 | |
| FR | 2736890 A1 | 1/1997 | |
| FR | 2950027 A1 | 3/2011 | |
| FR | 3061140 A1 | 6/2018 | |
| GB | 590514 A | 7/1947 | |
| GB | 641076 A | 8/1950 | |
| GB | 674651 A | 6/1952 | |
| GB | 718710 A | 11/1954 | |
| GB | 729801 A | 5/1955 | |
| GB | 745915 A | 3/1956 | |
| GB | 775469 A | 5/1957 | |
| GB | 809151 A | 2/1959 | |
| GB | 847684 A | 9/1960 | |
| GB | 852243 A | 10/1960 | |
| GB | 905498 A | 9/1962 | |
| GB | 952119 A | 3/1964 | |
| GB | 1009858 A | 11/1965 | |
| GB | 1019673 A | 2/1966 | |
| GB | 1036352 A | 7/1966 | |
| GB | 1291562 A | 10/1972 | |
| GB | 1333246 A | 10/1973 | |
| GB | 1347150 A | 2/1974 | |
| GB | 1390009 A | 4/1975 | |
| GB | 1401379 A | 7/1975 | |
| GB | 1424172 A | 2/1976 | |
| GB | 1470321 A | 4/1977 | |
| GB | 1514347 A | 6/1978 | |
| GB | 2040391 A | 8/1980 | |
| GB | 2057629 A | 4/1981 | |
| GB | 2075261 A | 11/1981 | |
| GB | 2110866 A | 6/1983 | |
| GB | 2155589 A | 9/1985 | |
| GB | 2159484 A | 12/1985 | |
| GB | 2159952 A | 12/1985 | |

(56) References Cited

FOREIGN PATENT DOCUMENTS

| GB | 2194020 A | 2/1988 |
|---|---|---|
| GB | 2274634 A | 8/1994 |
| GB | 2376928 A | 12/2002 |
| GB | 2403614 A | 1/2005 |
| GB | 2460196 A | 11/2009 |
| GB | 2467905 A | 8/2010 |
| GB | 2484526 A | 4/2012 |
| GB | 2498406 A | 7/2013 |
| GB | 2531079 A | 4/2016 |
| KR | 101026057 B1 | 3/2011 |
| WO | WO2007001851 A2 | 1/2007 |
| WO | WO2012047337 A1 | 4/2012 |
| WO | WO2016118791 A1 | 7/2016 |

OTHER PUBLICATIONS

Warrier, Jayachandran and Shaikh Faruque Ali, "Nonlinear Dynamics and Control of Helicopter Ground Resonance," Journal of Vibration and Control, vol. 28, No. 11-12, Jun. 1, 2022, retrieved from the Internet: URL:http://journals.sagepub.com/doi/full-xml/10.1177/1077546321996937 on Jan. 16, 2024.

Liu, Xiangyi, et al., "An Analytical Method for Coaxial Helicopter Ground Resonance," MATEC Web of Conferences, MATEC Web of Conferences, vol. 316, Jan. 1, 2020 (Jan. 1, 2020), p. 04005, XP093111860, ISSN: 2274-7214, DOI: 10.1051/matecconf/202031604005 Retrieved from the Internet: URL:https://dx.doi.org/10.1051/matecconf/2 02031604005>.

Bramwell, A.R.S., et al., "Bramwells Helicopter Dynamics," second edition, Jan. 1, 2001 (Jan. 1, 2001), pp. 1-397, XP009501001, ISBN: 978-0-7506-5075-5. Retrieved from the Internet: URL:http://rahauav.com/Library/Multirotors/Bramwell's%20Helicopter%20Dynamic•• www.RahaUAV.com.pdf.

Cox, Taylor and Scott Macdonald, "What is Ground Resonance?", downloaded from https://www.helis.com/howflies/groures.php on Sep. 20, 22.

McAdams, Tim, Ground Resonance, downloaded from https://blog.aopa.org/aopa/2012/07/13/ground-resonance/ on Sep. 13, 2022.

Lojewski, Reinhard, et al. "Influence of Contact Points of Helicopter Skid Landing Gears on Ground Resonance Stability," CEAS Aeronautical Journal (2020) 11:731-743, downloaded from https://link.springer.com/article/10.1007/s13272-020-00452-z on Sep. 13, 2022.

Garrison, Peter, "How Things Work: Ground Resonance When Is a Helicopter Lika a Patsy Cline Song? When it Falls to Pieces," Air & Space Magazine, Dec. 2008, downloaded from https://www.smithsonianmag.com/air-space-magazine/how-things-work-ground-resonance-94660854/ on Sep. 13, 2022.

Sahtu Helicopters Ltd., "Air Transportation Safety Investigation Report A18W0025, Collision with Terrain," Transportation Safety Board of Canada, Feb. 15, 2018, downloaded from https://bst-tsb.gc.ca/eng/rapports-reports/aviation/2018/a18w0025/a18w0025.html on Sep. 13, 2022.

Reddick, Harold K. Jr., "Army Helicopter Cost Drivers," Army Air Mobility Research and Development Laboratory, USAAMRDL-TM-7, Aug. 1975, downloaded from https://core.ac.uk/download/pdf/37321784.pdf on Sep. 13, 2022.

Eckert, Bernd, "Analytical and a Numerical Ground Resonance Analysis of a Conventionally Articulated Main Rotor Helicopter," Thesis presented at the Stellenbosch University in partial fulfilment of the reuirements for the degree of Master of Science in Mechanical Engineering, Supervisor: Prof J.L. van Niekerk, Mar. 2007.

\* cited by examiner

GROUND RESONANCE DETECTION AND WARNING SYSTEM AND METHOD

CROSS-REFERENCE TO RELATED APPLICATION

This application claims priority to India Provisional Patent Application No. 202211046471, filed Aug. 16, 2022, the entire content of which is incorporated by reference herein.

TECHNICAL FIELD

The present invention generally relates to rotorcraft ground resonance, and more particularly relates to systems and methods for detecting ground resonance and providing warnings thereof.

BACKGROUND

Ground resonance is a phenomenon that occurs when a rotorcraft, such as a helicopter, lands on one corner of the landing gear or with an asymmetric proportion of landing forces, thus causing an unbalanced centripetal force causing the rotor blades to rock out of phase and create an ever-increasing resonant vibration frequency on the entire helicopter. This tumultuous event applies the potential energy of the entire structure of the rotorcraft to create uncontrolled moments coming off of every major structure, potentially leading to the complete destruction of the rotorcraft. Although ground resonance is more likely to occur in rotorcraft equipped with lead-lag hinges, rotorcraft equipped with fully articulated rotor systems may also experience this phenomenon, though it is less likely.

When ground resonance occurs, or is imminent, the rotorcraft pilot needs to act quickly to prevent damage to the rotorcraft. For many pilots, the typical response to ground resonance is to power down the rotorcraft. However, powering down the rotorcraft will not reduce or solve ground resonance as the momentum and oscillation will continue to affect the rotorcraft. The more appropriate response is for the pilot to abandon the landing position and remove the rotorcraft from the ground to the hover position. At this point, the pilot can attempt a safe landing. Unfortunately, no warning system presently exists to assist pilots in taking this corrective action.

Hence, there is a need for a ground resonance detection and warning system that can detect an early onset of ground resonance and present pre-emptive and avoidance warnings to allow for manual correction or stopping ground resonance when it occurs without incurring major aircraft damage. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a ground resonance detection and warning system includes an inertial navigation system (INS), a sensor system, and a processing system. The INS is configured to sense an inertial profile of a rotorcraft and supply inertial data indicative of the inertial profile. The sensor system is configured to detect when the rotorcraft is at least partially on a landing surface and supply sensor data indicative thereof. The processing system is coupled to receive the inertial data from the INS and the sensor data from the sensor system. The processing system is configured, upon receipt of the inertial data and the sensor data, to (i) determine when the rotorcraft is at least partially on the landing surface and (ii) when the rotorcraft is at least partially on the landing surface: process the inertial data to determine when the inertial profile of the rotorcraft indicates ground resonance may occur and, generate one or more alert signals upon determining that ground resonance may occur.

In another embodiment, a method for detecting ground resonance and providing a warning regarding the same includes supplying, from an inertial navigation system (INS), inertial data indicative of an inertial profile of a rotorcraft, and supplying, from a sensor system, sensor data that indicates when the rotorcraft is at least partially on a landing surface. The sensor data is processed, in a processing system, to determine when the rotorcraft is at least partially on the landing surface, and when the rotorcraft is determined to be at least partially on the landing surface, the inertial data is processed, in the processing system to determine when the inertial profile of the rotorcraft indicates ground resonance may occur. Upon determining that ground resonance may occur, one or more alert signals are generated in the processing system.

In yet another embodiment, a rotorcraft includes a fuselage and a ground resonance detection and warning system. The ground resonance detection and warning system is disposed at least partially within the fuselage and includes an inertial navigation system (INS), a sensor system, and a processing system. The INS is configured to sense an inertial profile of a rotorcraft and supply inertial data indicative of the inertial profile. The sensor system is configured to detect when the rotorcraft is at least partially on a landing surface and supply sensor data indicative thereof. The processing system is coupled to receive the inertial data from the INS and the sensor data from the sensor system. The processing system is configured, upon receipt of the inertial data and the sensor data, to (i) determine when the rotorcraft is at least partially on the landing surface and (ii) when the rotorcraft is at least partially on the landing surface: process the inertial data to determine when the inertial profile of the rotorcraft indicates ground resonance may occur and, generate one or more alert signals upon determining that ground resonance may occur.

Furthermore, other desirable features and characteristics of the ground resonance detection and warning system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
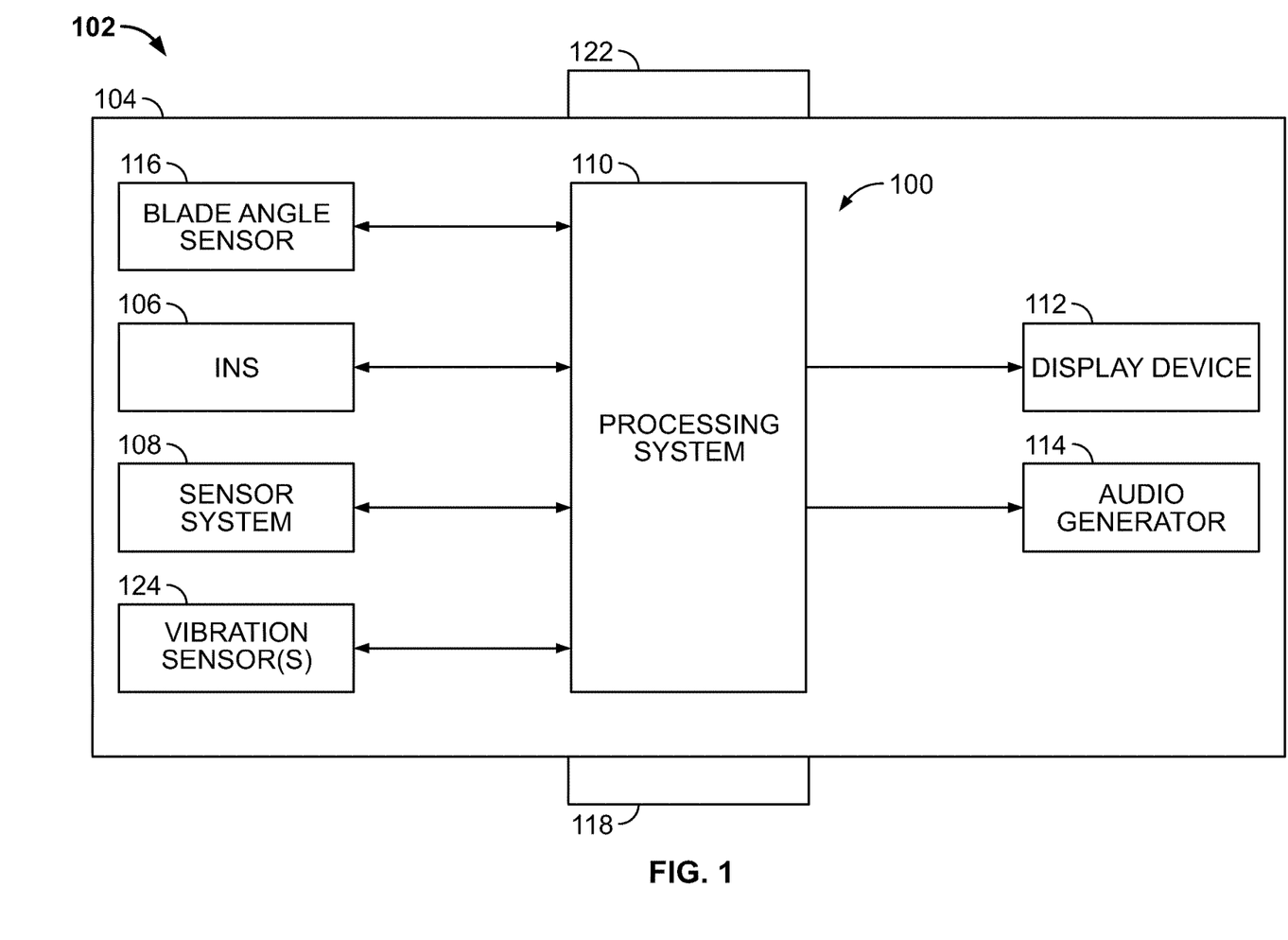
FIG. 1 depicts a functional block diagram of one embodiment of a ground resonance detection and warning system.

Referring to FIG. 1, a functional block diagram of one embodiment of a ground resonance detection and warning system 100 is depicted. The system 100 is preferably installed within a rotorcraft 102, and more particularly in or on a fuselage 104 of the rotorcraft 102, and includes at least an inertial navigation system (INS) 106, sensor system 108, and a processing system 110. The INS is configured to sense an inertial profile of the rotorcraft 102 and to supply inertial data indicative of the inertial profile. As is generally known, the INS 106 detects the attitude—pitch, yaw, and roll—of the rotorcraft 102. Thus, the inertial data indicative of the inertial profile includes data indicative of the attitude of the rotorcraft 102.

The sensor system 108 is configured to detect when the rotorcraft 102 is at least partially on a landing surface and supply sensor data indicative thereof. The sensor system 108 may be implemented using any one of numerous known sensor systems for detecting when the rotorcraft 102 is at least partially on a landing surface. For example, the sensor system 108 may be implemented using an altimeter, such as a radio altimeter, a barometric altimeter, or a laser altimeter. In other embodiments, the sensor system 108 may be implemented using any one of numerous known weight-on-wheels (WOW) sensor systems.

The processing system 110 generally represents the hardware, circuitry, processing logic, and/or other components configured to facilitate communications and/or interaction between the elements of the system 100 and perform additional processes, tasks and/or functions to support operation of the system 100, as described in greater detail below. Depending on the embodiment, the processing system 110 may be implemented or realized with a general-purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 110 includes processing logic that may be configured to carry out the functions, techniques, and processing tasks associated with the operation of the system 100 described in greater detail herein. Furthermore, the steps of a method or algorithm described in connection with the embodiments disclosed herein may be embodied directly in hardware, in firmware, in a software module executed by the processing system 110, or in any practical combination thereof. In accordance with one or more embodiments, the processing system 110 includes or otherwise accesses a data storage element, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 110, cause the processing system 110 to execute and perform one or more of the processes, tasks, operations, and/or functions described herein.

With the above in mind, it is noted that the processing system 110 is coupled to receive the inertial data from the INS 106 and the sensor data from the sensor system 108. The processing system 110 is configured, upon receipt of the inertial data and the sensor data, to determine when the rotorcraft 102 is at least partially on a landing surface. When the processing system 110 determines that the rotorcraft 102 is at least partially on the landing surface, the processing system 110 is further configured to process the inertial data to determine when the inertial profile of the rotorcraft 102 indicates ground resonance may occur. If, based on the inertial profile of the rotorcraft 102, the processing system 110 determines that ground resonance may occur, the processing system 110 will generate one or more alert signals. It should be noted that processing the inertial data to determine when the inertial profile of the rotorcraft 102 indicates ground resonance may occur only when the rotorcraft 102 is at least partially on a landing surface will prevent any false determinations of ground resonance.

It will be appreciated that the processing system 110 may be a stand-alone system or it may be part of one of the avionic systems disposed within the rotorcraft 102. It may also, in some embodiments, be part of a portable computing device. If the processing system 110 comprises one of the avionic systems, it may comprise any one of numerous avionic systems such as, for example, a flight management system (FMS), a flight control system (FCS), or a weather radar system. In one particular embodiment, however, the processing system 110 comprises an enhanced ground proximity warning system (EGPWS). If the processing system 110 comprises a portable computing device, it may comprise an electronic flight bag (EFB), a tablet, or smartphone.

Regardless of how the processing system 110 is specifically implemented, the one or more alert signals may include display command signals and/or audio commands. When the one or more alert signals include display command signals, it will be appreciated that the system 100 will additionally include at least one display device 112. The display device 112, which may be implemented using any one of numerous known display technologies, is coupled to receive the display command signals and is configured, upon receipt of the display command signal, to render textual response instructions. The textual response instructions may be, for example, instructions that provide exit guidance to the pilot. For example, the textual response instructions may instruct the pilot to avoid the landing and instead increase engine speed and return to a hover position, or to power down the engine and exit the rotor craft.

When the one or more alert signals include audio commands, it will be appreciated that the system 100 will additionally include at least one audio generator 114. The audio generator 114, which may be implemented using any one of numerous known audio generating devices, is coupled to receive the audio command signals and is configured, upon receipt of the audio command signals, to emit an audible alert. The audible alert may be, for example, audible instructions similar to the above-described textual response instructions, such as "Ground Resonance—Go to Hover". In addition, if the processing system 110 determines, based upon the inertial data, that the ground resonance is likely to occur when the collective is down, the audible instructions may include instructions such as, for example, "Brace!" and/or "Evacuate!".

As FIG. 1 further depicts, the system 100 may additionally include, at least in some embodiments, a blade angle sensor 116. The blade angle sensor 116, when included is configured to detect a separation angle between the rotors of the rotorcraft 102 and to supply blade angle sensor data representative of the separation angle. In these embodiments, the processing system 110 is further coupled to receive the blade angle sensor data and is further configured, upon receipt of the blade angle sensor data, to determine when the separation angle is less than a predetermined magnitude. As may be appreciated, the predetermined magnitude may vary from rotorcraft type to rotorcraft type, but is selected as a magnitude that, based on actual data, indicates ground resonance is likely to occur or is occurring.

Figure 2:
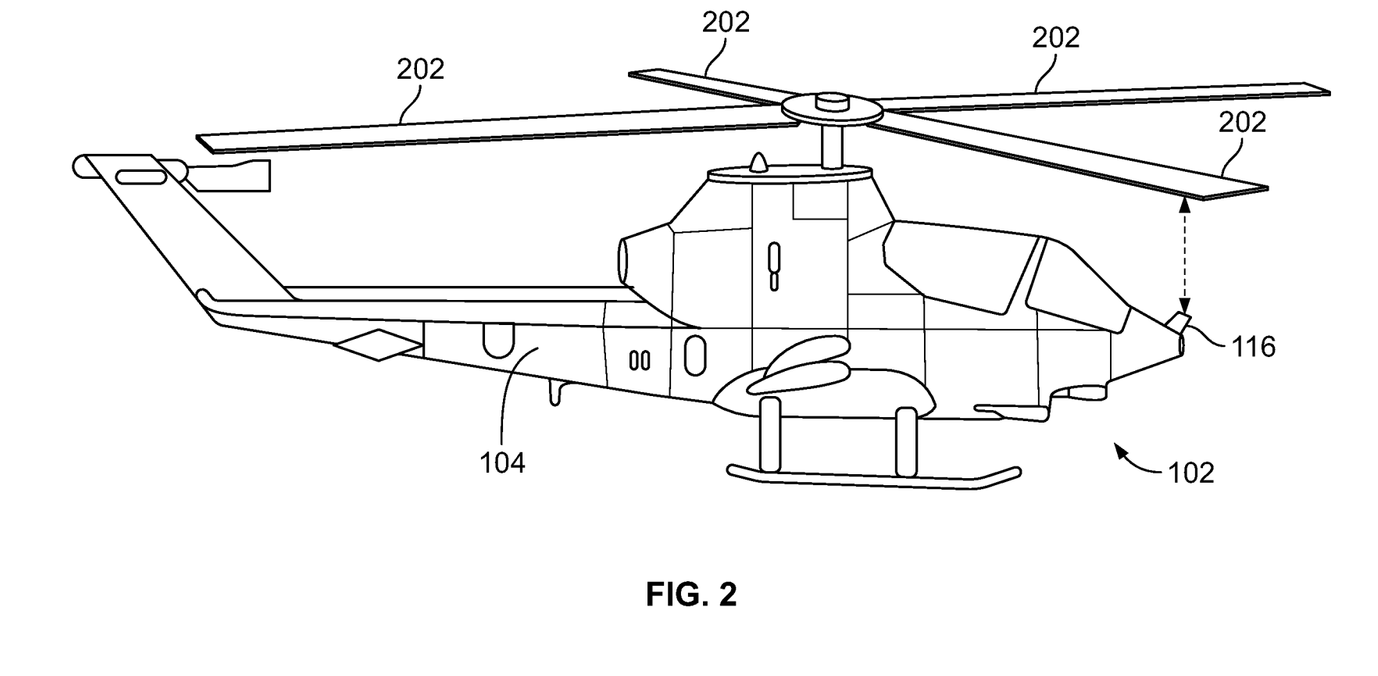
FIG. 2 depicts a side view of one example of a rotorcraft that may include a blade angle sensor that may be used with the system of FIG. 1.

It will be appreciated that the blade angle sensor 116 may be implemented using any one of numerous types of sensors. In one particular embodiment, which is depicted in FIG. 2, the blade angle sensor 116 is implemented using an optical sensor that is mounted, for example, on the front (or nose) of the fuselage 104. The optical sensor 116 is aimed upward to readily detect the separation angle of the rotor blades 202.

In addition to detecting and providing ground resonance warning, the system 100 may be configured to monitor the health of certain portions of the rotorcraft. More specifically, the system 100 may be configured to monitor the health of the landing gear dampeners 118 and/or the rotor head shock absorbers 122. To do so, and as FIG. 1 further depicts, the system 100 may additionally include one or more vibration sensors 124. The one or more vibration sensors 124, which may be separate from, or part of, the INS 106, are configured to sense vibrations of the rotorcraft 102 and supply vibration data representative thereof.

In these embodiments, the processing system 110 is further coupled to receive the vibration data and is further configured to track the vibrations of the rotorcraft 102 during each take-off and landing maneuver. When the tracked vibrations exceed a predetermined threshold, the processing system 110 is further configured to generate a warning signal indicating that the performance of the landing gear dampeners 118 has degraded to a point requiring maintenance.

As noted above, the processing system 110 may also be configured, in at least some embodiments, to determine the health state of the one or more rotor shock absorbers 122. To do so, the processing system 110 is further configured to track the blade angle sensor data over time to detect deterioration.

Figure 3:
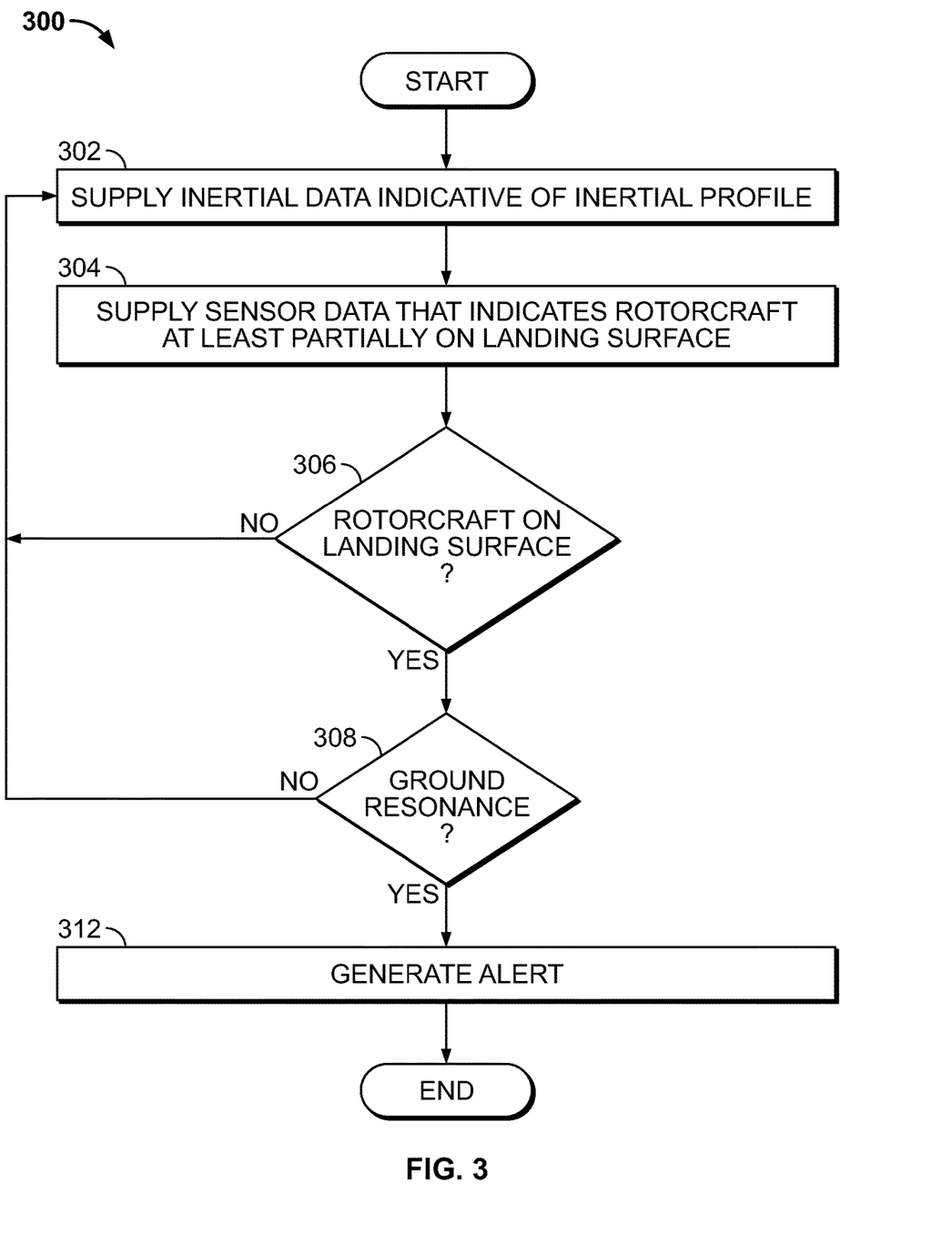
FIG. 3 depicts a method, in flowchart form, that may be implemented in the system of FIG. 1.

Having described the overall functionality of the system 100, a description of a method for detecting ground resonance and providing a warning that is implemented in the system 100 will be described. The method 300, which is depicted in flowchart form in FIG. 3, represents various embodiments of a method for detecting ground resonance and providing a warning. For illustrative purposes, the following description of method 300 may refer to elements mentioned above in connection with FIG. 1. In practice, portions of method 300 may be performed by different components of the described system 100. It should be appreciated that method 300 may include any number of additional or alternative tasks, the tasks shown in FIG. 3 need not be performed in the illustrated order, and method 300 may be incorporated into a more comprehensive procedure or method having additional functionality not described in detail herein. Moreover, one or more of the tasks shown in FIG. 3 could be omitted from an embodiment of the method 300 if the intended overall functionality remains intact.

The method 300 starts by supplying, from the inertial navigation system (INS) 106, inertial data indicative of the inertial profile of a rotorcraft 102 (302) and supplying, from the sensor system 108, sensor data that indicates when the rotorcraft 102 is at least partially on a landing surface (304). The processing system 110 then processes the sensor data to determine when the rotorcraft 102 is at least partially on the landing surface (306). When the rotorcraft is not determined to be at least partially on the landing surface, the method returns to step (302). However, when the rotorcraft is determined to be at least partially on the landing surface, the processing system 110 processes the inertial data to determine when the inertial profile of the rotorcraft indicates ground resonance may occur (308). When the inertial profile of rotorcraft does not indicate ground resonance may occur, the method returns to step (302). However, upon determining that ground resonance may occur, one or more alert signals are generated in the processing system 110 (312).

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A ground resonance detection and warning system, comprising:
    an inertial navigation system (INS) configured to sense an inertial profile of a rotorcraft and supply inertial data indicative of the inertial profile;
    a sensor system configured to detect when the rotorcraft is at least partially on a landing surface and supply sensor data indicative thereof; and
    a processing system coupled to receive the inertial data from the INS and the sensor data from the sensor system, the processing system configured, upon receipt of the inertial data and the sensor data, to (i) determine when the rotorcraft is at least partially on the landing surface and (ii) when the rotorcraft is at least partially on the landing surface:
  process the inertial data to determine when the inertial profile of the rotorcraft indicates ground resonance may occur and,
  generate one or more alert signals upon determining that ground resonance may occur.

2. The system of claim 1, wherein the processing system comprises an avionic system.

3. The system of claim 2, wherein the avionic system comprises an enhanced ground proximity warning system (EGPWS).

4. The system of claim 1, wherein:
the one or more alert signals include display command signals; and
the system further comprises a display device coupled to receive the display command signals and configured, upon receipt thereof, to render textual response instructions.

5. The system of claim 1, wherein:
the one or more alert signals include audio commands; and
the system further comprises an audio generator coupled to receive the audio command signals and configured, upon receipt thereof, to emit an audible alert.

6. The system of claim 1, further comprising:
a blade angle sensor configured to detect a separation angle between rotors of the rotorcraft and supply blade angle sensor data representative of the separation angle,
wherein the processing system is further coupled to receive the blade angle sensor data and is further configured, upon receipt of the blade angle sensor data, to determine when the separation angle is less than a predetermined magnitude.

7. The system of claim 6, wherein the blade angle sensor comprises an optical sensor.

8. The system of claim 6, wherein:
the rotorcraft further comprises one or more rotor blade shock absorbers; and
the processing system is further configured to process the blade angle sensor data to determine a health state of the one or more rotor blade shock absorbers.

9. The system of claim 1, wherein the sensor system comprises a radio altimeter.

10. The system of claim 1, wherein the sensor system comprises one or more weight-on-wheels (WOW) sensors.

11. The system of claim 1, further comprising:
one or more vibration sensors, the one or more vibration sensors configured to sense vibrations of the rotorcraft and supply vibration data representative thereof,
wherein:
  the rotorcraft further comprises landing gear dampeners, and
  the processing system is further coupled to receive the vibration data and is further configured to:
    track vibrations of the rotorcraft during take-off and landing maneuvers, and
    when the tracked vibrations exceed a predetermined threshold vibration, generate a warning signal indicating that performance of the landing gear dampeners has degraded to a point requiring maintenance.

12. A method for detecting ground resonance and providing a warning regarding the same, the method comprising the steps of:

supplying, from an inertial navigation system (INS), inertial data indicative of an inertial profile of a rotorcraft;
supplying, from a sensor system, sensor data that indicates when the rotorcraft is at least partially on a landing surface; and
processing, in a processing system, the sensor data to determine when the rotorcraft is at least partially on the landing surface;
when the rotorcraft is determined to be at least partially on the landing surface, processing the inertial data, in the processing system to determine when the inertial profile of the rotorcraft indicates ground resonance may occur; and
upon determining that ground resonance may occur, generating, in the processing system, one or more alert signals.

13. The method of claim 12 further comprising rendering, on a display device, textual response instructions.

14. The method of claim 12, further comprising generating, with an audio generator, an audible alert.

15. The method of claim 12, further comprising:
supplying, with a blade angle sensor, blade angle sensor data indicative of a separation angle between rotors of the rotorcraft; and
processing, in the processing system, the blade angle sensor data to determine when the separation angle is less than a predetermined magnitude.

16. The method of claim 15, further comprising:
processing, in the processing system, the blade angle sensor data to determine a health state of the one or more rotor blade shock absorbers.

17. The method of claim 12, further comprising:
supplying, with one or more vibration sensors, vibration data indicative of vibrations of the rotorcraft;
processing, in the processing system, the vibration data to:
  track vibrations of the rotorcraft during take-off and landing maneuvers, and
  when the tracked vibrations exceed a predetermined threshold vibration, generate a warning signal indicating that performance of the landing gear dampeners has degraded to a point requiring maintenance.

18. A rotorcraft, comprising:
a fuselage; and
a ground resonance detection and warning system disposed at least partially within the fuselage, the ground resonance detection and warning system comprising:
  an inertial navigation system (INS) configured to sense an inertial profile of a rotorcraft and supply inertial data indicative of the inertial profile;
  a sensor system configured to detect when the rotorcraft is at least partially on a landing surface and supply sensor data indicative thereof; and
  a processing system coupled to receive the inertial data from the INS and the sensor data from the sensor system, the processing system configured, upon receipt of the inertial data and the sensor data, to (i) determine when the rotorcraft is at least partially on the landing surface and (ii) when the rotorcraft is at least partially on the landing surface:
    process the inertial data to determine when the inertial profile of the rotorcraft indicates ground resonance may occur and,
    generate one or more alert signals upon determining that ground resonance may occur.

19. The rotorcraft of claim 18, further comprising:
a blade angle sensor configured to detect a separation angle between rotors of the rotorcraft and supply blade angle sensor data representative of the separation angle,
wherein the processing system is further coupled to receive the blade angle sensor data and is further configured, upon receipt of the blade angle sensor data, to determine when the separation angle is less than a predetermined magnitude.

20. The rotorcraft of claim 18, further comprising:
one or more vibration sensors, the one or more vibration sensors configured to sense vibrations of the rotorcraft and supply vibration data representative thereof,
wherein:
   the rotorcraft further comprises landing gear dampeners, and
   the processing system is further coupled to receive the vibration data and is further configured to:
      track vibrations of the rotorcraft during take-off and landing maneuvers, and
      when the tracked vibrations exceed a predetermined threshold vibration, generate a warning signal indicating that performance of the landing gear dampeners has degraded to a point requiring maintenance.

* * * * *